US010545902B2

(12) United States Patent
Groissman et al.

(10) Patent No.: US 10,545,902 B2
(45) Date of Patent: Jan. 28, 2020

(54) DEVICES AND METHODS FOR DECOUPLING OF PHYSICAL LAYER

(71) Applicant: Western Digital Technologies, Inc., San Jose, CA (US)

(72) Inventors: Mark Moty Groissman, Beer Sheva (IL); Alex Tetelbaum, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/163,412

(22) Filed: Oct. 17, 2018

(65) Prior Publication Data

US 2019/0391947 A1 Dec. 26, 2019

Related U.S. Application Data

(60) Provisional application No. 62/689,673, filed on Jun. 25, 2018.

(51) Int. Cl.
*G06F 13/40* (2006.01)
*G06F 17/50* (2006.01)
*H03K 19/0175* (2006.01)
*H01L 29/94* (2006.01)

(52) U.S. Cl.
CPC ...... *G06F 13/4068* (2013.01); *G06F 17/5072* (2013.01); *H03K 19/017545* (2013.01); *H01L 29/94* (2013.01)

(58) Field of Classification Search
CPC combination set(s) only.
See application file for complete search history.

(56) References Cited

U.S. PATENT DOCUMENTS

| 5,469,324 | A | * | 11/1995 | Henderson | H05K 1/03 29/25.42 |
|---|---|---|---|---|---|
| 9,589,627 | B1 | | 3/2017 | Wilson et al. | |
| 2004/0141398 | A1 | * | 7/2004 | Hwang | G11O 5/063 365/230.03 |
| 2006/0041693 | A1 | * | 2/2006 | Mangano | G06F 13/4059 710/58 |
| 2012/0249107 | A1 | * | 10/2012 | Cowley | H02M 3/1584 323/290 |
| 2014/0175608 | A1 | | 6/2014 | Chang et al. | |
| 2015/0363349 | A1 | * | 12/2015 | Remple | G06F 13/426 710/313 |
| 2017/0231094 | A1 | * | 8/2017 | Blackshear | H05K 1/0298 |
| 2018/0317316 | A1 | * | 11/2018 | Welsh | H05K 1/0231 |

* cited by examiner

*Primary Examiner* — Raymond N Phan
(74) *Attorney, Agent, or Firm* — Patterson & Sheridan, LLP; Steven H. Versteeg (57) ABSTRACT

A device with a physical layer (PHY) core component, a PHY I/O component, a decoupling I/O component, and a decoupling core component, where the PHY core component is adjacent to the PHY I/O component, the PHY I/O component is adjacent to the decoupling I/O component, the decoupling I/O component is adjacent to the decoupling core component and is positioned a first distance away from the PHY core component, and the decoupling core component is adjacent to an edge of the device and is positioned a second distance away from the PHY core component.

27 Claims, 6 Drawing Sheets

DEVICES AND METHODS FOR DECOUPLING OF PHYSICAL LAYER

CROSS-REFERENCE TO RELATED APPLICATIONS

This application claims benefit of U.S. Provisional Patent Application Ser. No. 62/689,673, filed Jun. 25, 2018, which is herein incorporated by reference.

BACKGROUND OF THE DISCLOSURE

Field of the Disclosure

Embodiments of the present disclosure generally relate to storage devices, such as solid state drives (SSD), and more specifically, to the design of SSD storage device controllers.

Description of the Related Art

In conventional SSD controller design, decoupling capacitance (decap) component cells (components) are placed or positioned in multiple areas of a printed circuit card assembly, logic circuit, or integrated circuit (IC) in an effort to minimize noise and diminish unwanted voltage drops. Circuit designers often use standard decap components found in software design libraries to populate a circuit design. As the capacitance of decap components are very limited (often less than 5 fF/um$^2$), the integration of a large number of decap components into a controller design requires following restrictive design rule checks and uses up valuable IC area. Thus, the overall controller capacitance is limited, while unwanted capacitive resistance becomes relatively high due to decap component distribution throughout the design. The use of decap components inside physical layer (PHY) blocks is also possible, where the PHY layer refers to the circuitry required to implement physical layer functions and connects a link layer to a physical medium such as copper cable or optical fiber. However, this makes the integration of decap components within the PHY layer challenging because of size and geometry constraints.

Decap components are often scattered throughout the PHY layer as standard cells electrically coupled to other blocks. One drawback of using decap components is the limited capacity of the decap components, which are electrically coupled by low metals which are physically narrow, thus having high resistance. Another drawback is the high equivalent series resistance (ESR) of the resultant design. This is due to the distribution of thousands of relatively small-capacitance decap cells across the whole SOC area, particularly the PHY. Thus, what is needed are devices and methods for employing decoupling capacitance to a circuit while minimizing adverse effects such as size, power usage, voltage drops, and ESR.

SUMMARY OF THE DISCLOSURE

The present disclosure generally relates to a device with a PHY core component, a PHY I/O component, a decoupling I/O component, and a decoupling core component, where the PHY core component is adjacent to the PHY I/O component, the PHY I/O component is adjacent to the decoupling I/O component, the decoupling I/O component is adjacent to the decoupling core component and is positioned a first distance away from the PHY core component, and the decoupling core component is adjacent to an edge of the device and is positioned a second distance away from the PHY core component.

In another embodiment, a device having a physical layer (PHY) core component, a system-on-chip core logic component, an input/output (I/O) component, a decoupling I/O component, a decoupling core component, and means for operating a logic circuit, where the PHY core component is electrically coupled to the system-on-chip core logic component and the decoupling core component, the system-on-chip core logic component is logically coupled to the I/O component, the PHY core component is electrically isolated from the I/O component, and the decoupling I/O component, and the decoupling core component, the I/O component is electrically coupled to the decoupling I/O component, the PHY core component is logically coupled to the decoupling core component, and the decoupling core component is electrically isolated from the I/O component and the decoupling I/O component.

In another embodiment, a method of configuring a logic circuit, that includes positioning a physical layer (PHY) core component onto the logic circuit, positioning a system-on-chip core logic component onto the logic circuit, positioning a PHY input/output (I/O) component adjacent to the PHY core component, positioning a decoupling I/O component adjacent to the PHY I/O component and a first distance away from the PHY core component, and positioning a decoupling core component adjacent to an edge of the logic circuit and a second distance away from the PHY core component, and where the PHY core component is electrically coupled to the system-on-chip core logic component, the system-on-chip core logic component is logically coupled to the I/O component, the PHY core component is electrically isolated from the I/O component, the decoupling I/O component, and the decoupling core component, the I/O component is electrically coupled to the decoupling I/O component, the PHY core component is logically coupled to the decoupling core component, and the decoupling core component is electrically isolated from the I/O component and the decoupling I/O component.

In another embodiment, a system that includes a PHY core component, a PHY I/O component, a decoupling I/O component, and a decoupling core component, where the decoupling core component is adjacent to an edge of a logic circuit assembly, the decoupling I/O component is adjacent to the decoupling core component, the PHY I/O component is adjacent to the decoupling I/O component and spaced a first distance from the edge of the logic circuit assembly, and the PHY core component is adjacent to the PHY I/O component and spaced a second distance from the edge of the logic circuit assembly.

In another embodiment, a system that includes a host device and a logic circuit coupled to the host device, the logic circuit having a PHY core component, a system-on-chip core logic component, a I/O component, a decoupling I/O component, and a decoupling core component, where the decoupling core component is spaced a first distance from the decoupling I/O component, and the system-on-chip core logic component is spaced a second distance from the decoupling core component.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a device with a PHY core component, a PHY I/O component, a decoupling I/O component, and a decoupling core component, where the PHY core component is adjacent to the PHY I/O component, the PHY I/O component is adjacent to the decoupling I/O component, the decoupling I/O component is adjacent to the decoupling core component and is positioned a first distance away from the PHY core component, and the decoupling core component is adjacent to an edge of the device and is positioned a second distance away from the PHY core component.

The present disclosure reveals devices for, and methods of, positioning a decoupling capacitance component onto a logic circuit assembly. In at least one embodiment, the logic circuit assembly is a SOC used as a storage controller. When operably placed, a decoupling capacitive component positioned a non-zero distance away from the PHY core provides for more efficient space usage of the logic circuit, allows the employment of larger-sized capacitances as compared to decoupling capacitances spread throughout the SOC core logic, allows for more efficient routing of SOC logic traces, permits direct wiring between the core logic and the PHY, and allows for lower ESR values. As disclosed herein, operably-placed decoupling capacitance components use less logic circuit space as compared to conventional design methodologies.

Figure 1:
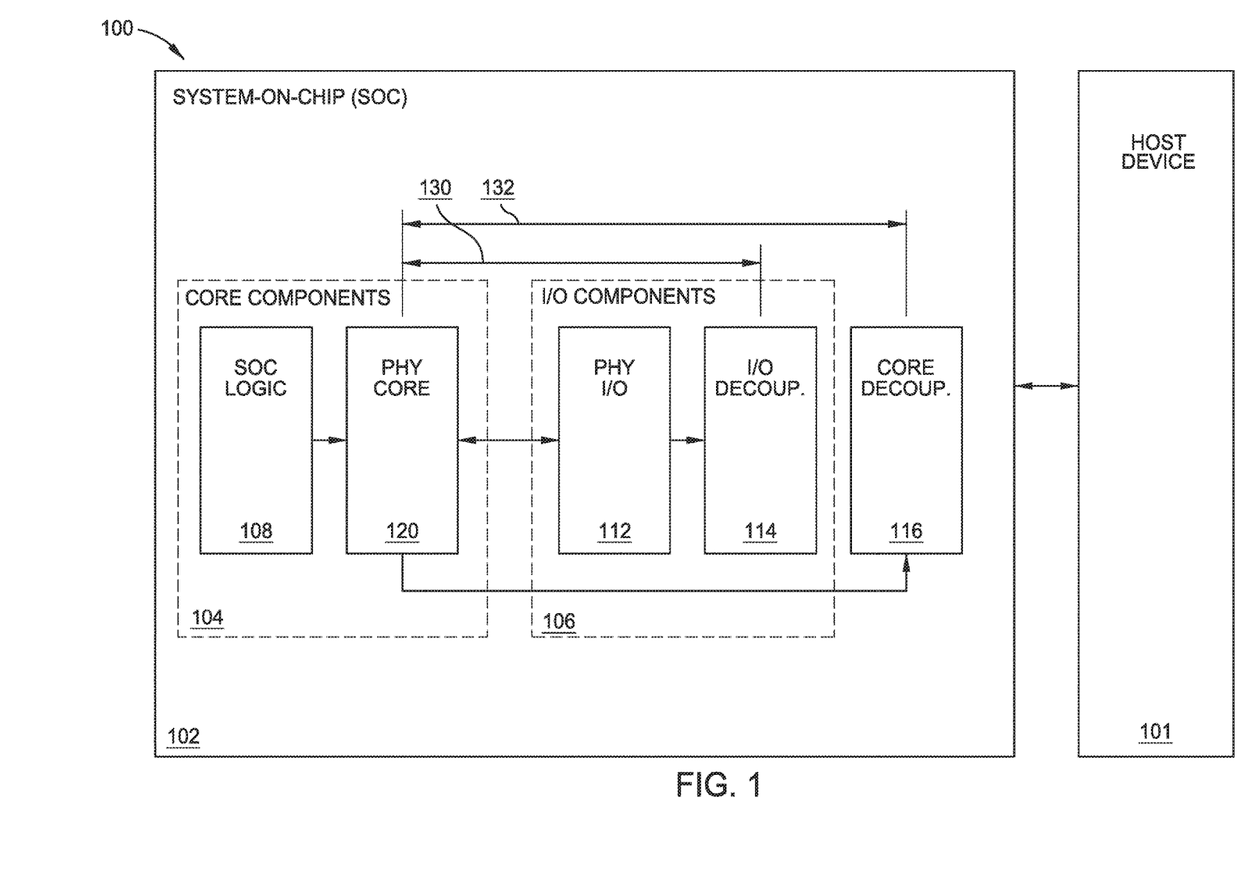
FIG. 1 is a schematic block diagram illustrating a SOC device with a core component area and an I/O component area, according to one embodiment.

FIG. 1 is a schematic block diagram illustrating a logic circuit assembly 100 with SOC device 102 containing a core components area (core component) 104, a I/O components area (I/O component) 106, and a core decoupling component 116. The logic circuit assembly 100 includes the SOC device 102 with at least two component areas: the core component 104 with a SOC logic processor or application controller (SOC logic) 108 and a PHY core 120, and the I/O component 106. In some embodiments, the SOC logic 108 has one or more processors configured to operate a storage device system and can store, retrieve, and access data within local and remote memory. The PHY core 120 is electrically coupled to the SOC logic 108, and is electrically isolated from the PHY I/O component 112, the I/O decoupling component 114, and the core decoupling component 116. The I/O decoupling component 114 is positioned a non-zero first distance 130 away from the PHY core 120. The core decoupling component 116 is positioned a second distance 132 away from the PHY core 120. In one embodiment, the first distance 130 is shorter than the second distance 132, while in other embodiments, the first distance 130 is longer than the second distance 132. In at least one embodiment, the logic circuit assembly 100 is a storage system controller for accessing and controlling data to and from local and remote memory locations.

A host device 101 is coupled to the SOC device 102. In some embodiments, the SOC device 102 may include additional components or modules not shown in FIG. 1 for the sake of clarity. Also in some embodiments, the physical dimensions and connector configurations of the logic circuit assembly 100 conforms to one or more standard form factors. Some example standard form factors include, but are not limited to, a 3.5" data storage device (e.g., a hard disk drive (HDD) or SSD), 2.5" data storage device, a 1.8" data storage device, a peripheral component interconnect (PCI) device, a PCI-extended (PCI-X) device, a PCI Express (PCIe) (e.g., PCIe ×1, ×4, ×8, ×16, PCIe Mini Card device, a MiniPCl device, and the like). In some embodiments, the SOC device 102 may be directly coupled (e.g., directly soldered) to a motherboard of the host device 101.

In the present embodiment, elements within the core components 104 are electrically isolated from selected elements of the SOC device 102, including the I/O components 106. In this disclosure, "electrically isolated" is defined as not sharing the same power supply voltage source. In the present embodiment, elements within core component 104, including the SOC logic 108 and the PHY core 120, are powered by a different core supply than elements elsewhere, including the I/O components 106. At the same time, some elements or blocks of SOC device 102 communicate and exchange data with each other, and are considered "logically coupled" through the use of level-shifting logic. Therefore, elements of the SOC device 102 can be electrically isolated from one another while logically coupled together. Likewise, in at least one embodiment, the core decoupling component 116 is electrically and logically isolated from the SOC logic 108 as shown in FIG. 1. In yet other embodiments, the core decoupling component 116 is logically coupled to the core component area 104, including both of SOC logic 108 and the PHY core 120. Also, the PHY core 120 and the core decoupling component 116 are electrically coupled.

The I/O component 106 includes the PHY I/O component 112, which provides interfacing for the core component 104 and other components of the logic circuit assembly 100, and an I/O decoupling component 114 that provides dedicated decoupling of PHY I/O 112. In some configurations, I/O decoupling component 114 may be employed to decouple other power supply voltages of different I/O components 106. The SOC device 102 also includes the core decoupling component 116 which contains decoupling capacitance and provides dedicated decoupling of PHY core 120, and in some embodiments, SOC logic 108. In some configurations, core decoupling component 116 may be employed to decouple other power supply voltages of different blocks of SOC logic 108.

In some embodiments, it is highly desirable to electrically isolate the I/O decoupling component 114 from the core component 104 in an effort to maintain the highest signal quality and transmission speed with a minimum of errors. In the present embodiment, the I/O decoupling component 114 is positioned a first non-zero distance 130 from the PHY core 120 and closer to the PHY core 120 than the core decoupling component 116. In other embodiments, the I/O decoupling component 114 may be positioned further away from the PHY core 120 than the core decoupling component 116. This positions the I/O decoupling component 114 a first non-zero distance 130 away from the PHY core 120 with the core decoupling component 116 positioned the second distance 132 away from the PHY core 120, with the first distance 130 more than the second distance 132. In another embodiment, both the I/O decoupling component 114 and the core decoupling component 116 are positioned an equal first distance 130 away from the PHY core 120.

Also in some embodiments, there may be a plurality of PHY cores 120 in a SOC device 102, with each PHY core 120 logically coupled to, and electrically isolated from, a plurality of I/O components 106 and dedicated core decoupling components 116. In yet other embodiments, the plurality of PHY cores 120 may be electrically isolated from, a single I/O component 106 and coupled to the single core decoupling component 116. Also in some embodiments, there may also be a plurality of PHY I/O blocks 112 decoupled by a plurality of I/O decoupling components 114 Other embodiments are possible and are not limited by the examples disclosed herein.

The I/O component 106 may include a data bus for exchanging data with the host device 101 and a control bus for exchanging commands with the host device 101. The I/O component 106 may operate in accordance with any suitable protocol. As an example, the I/O component 106 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially-attached SCSI (SAS), PCI, PCIe, non-volatile memory express (NVMe), and the like. In some embodiments, the electrical connections of the I/O component 106 may also permit the SOC device 102 to receive power from the host device 101.

In some embodiments, the host device 101 communicates with the SOC device 102 via the I/O component 106. The host device 101 can include, or included in, any of a wide range of devices, including computer servers, network attached storage (NAS) units, desktop computers, notebooks (e.g., laptops) computers, tablet computers, set-top boxes, telephone handsets such as "smart" phones, "smart" pads, televisions, cameras, display devices, digital media players, video gaming consoles, video streaming devices, and the like.

The core decoupling component 116 is electrically coupled to, and physically isolated from, the PHY core 120 a non-zero second distance 132. In this manner, the core decoupling component 116 provides decoupling capability to the PHY core 120 while not consuming valuable area within the core component 104. Also in some embodiments, the core decoupling component 116 is positioned on a different substrate than the core component 104 in a SOC device 102. In the present embodiment, the core decoupling component 116 is positioned the second distance 132 away from the PHY core 120 on the same substrate. In addition, by positioning the core decoupling component 116 a distance away from the PHY core 120, data and signal routes within the SOC logic 108 and between PHY core 120 can be shorter, permitting faster communication times and higher data rates and bandwidths. Also in some embodiments, the core decoupling component 116 and the I/O decoupling component 114 are fabricated from metal-oxide-metal (MOM) or MOS capacitors. In yet other embodiments, the core and I/O decoupling components may be fabricated on a different substrate layer than the SOC logic 108 or other core components 104.

In some embodiments, the core decoupling component 116 and the I/O decoupling component 114 include a plurality of 3-dimensional (3-D) on-die capacitors. The 3-D capacitors are fabricated from MOM and MOS (poly) capacitors by placing one poly capacitor (based on an nMOS transistor) on a bottom layer of a substrate starting from the p-sub layer to one of an intermediate metal layers. The transistor's gate is then connected to a power supply while the transistor's source and drain are shortened and connected to ground. Next, the MOM capacitor is fabricated over the poly capacitor beginning at one of the intermediate metal layers, ending at one of the high metal layers (not shown), according to one embodiment, thus forming a decoupling component.

The devices and methods disclosed herein positions the core decoupling component 116 the second distance 132 away from the PHY core 120 it is electrically coupled to. This approach allows traces and electrical lines on the logic circuit assembly 100 to be placed without the restraints of having to accommodate decoupling capacitors physically located near the PHY core 120. By locating the core decoupling component 116 to a different part of the SOC device 102, and by using the highest possible substrate layer available, higher values of capacitances can be used, allowing for a more efficient design and utilizing the minimum amount of circuit space and reducing cost. This also allows the use of MOM capacitors. In addition, by relocating the core decoupling component 116 a distance away from the PHY core 120, more direct and shorter interconnections can be made between the SOC logic 108 and the PHY core 120. Additionally, relocation of core decoupling component 116 to the edge of the SOC device 102 allows fabricating the core decoupling component 116 from lower chip levels of transistors to a high AP layer. The NMOS capacitor is built at the bottom layer while higher metals are employed for MOM capacitors, utilizing the whole available area of the core decoupling component 116 to be used for decoupling. This presents the advantage of shorter runs and network connections that result in higher speeds, higher bandwidth, less noise, and higher possible operating frequencies. Finally, the valuable SOC logic 108 area can be reserved for logic gates and other higher-priority items while the capacitors are positioned at a different area of the SOC device 102. Also in some embodiments, the SOC device 102 may include blocks or elements employing DDR PHY, PCIE PHY, or SATA PHY methodologies. Other embodiments are possible, and are not limited by this disclosure.

In another embodiment, the PHY core 120 and the SOC logic 108 are supplied by the same power supply voltage source. In this embodiment, it is possible to decouple both areas by the core decoupling component 116. In another embodiment, the PHY I/O component 112 and other components of I/O component 106, including output pads, drivers, and associated circuitry (not shown in FIG. 1), are supplied by the same power supply voltage source and are decoupled by the I/O decoupling component 114.

Figure 2:
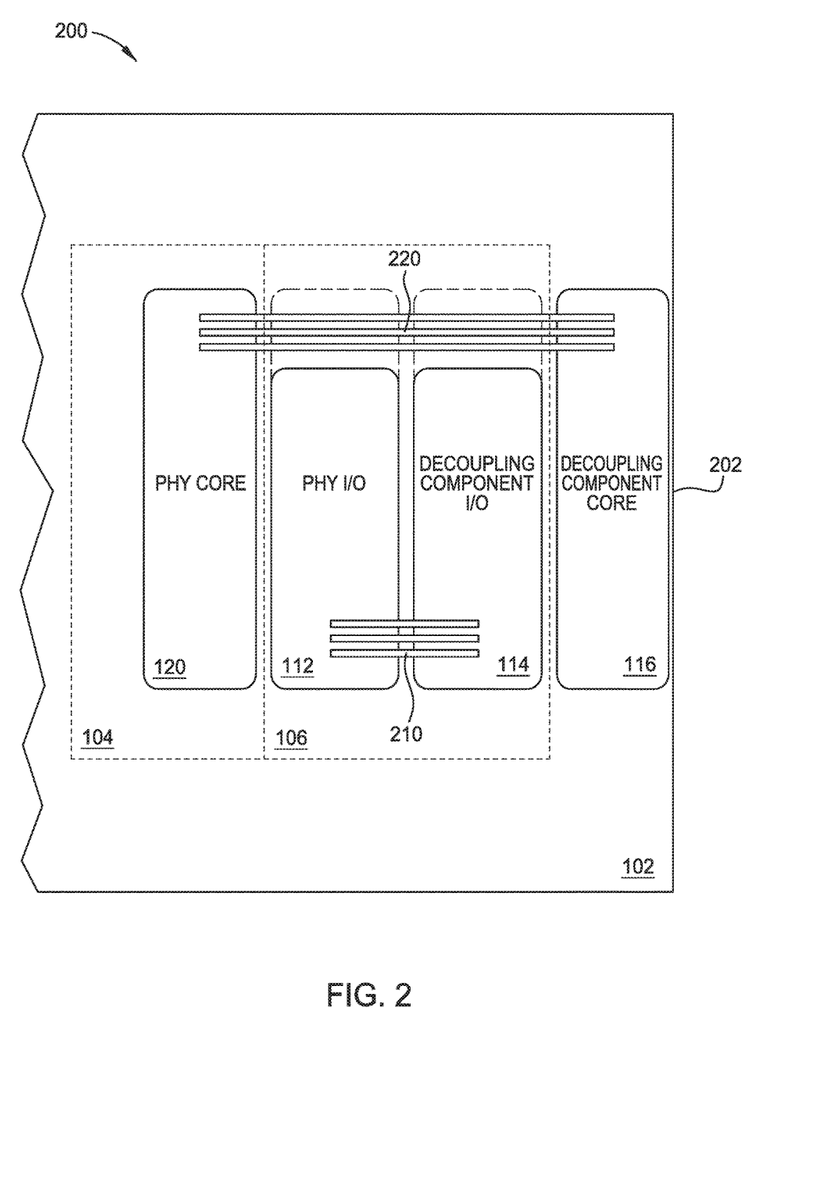
FIG. 2 is a block diagram of a SOC device in which a decoupling capacitance component core is positioned at a right side edge of the SOC device, according to one embodiment.

FIG. 2 is a block diagram 200 of the SOC device 102 of FIG. 1 in which the core decoupling component 116 is positioned at a right side edge 202 of the SOC device 102, according to one embodiment. The diagram 200 includes a first set of logical interconnections 210 coupling the PHY I/O 112 with the I/O decoupling component 114, and a second set of logical interconnections 220 coupling the PHY core 120 to the decoupling component core 116. In one embodiment, the core decoupling component 116 is positioned on the right side edge 202 of the SOC device 102. In this embodiment, there is physical separation between the decoupling component core 116 and the core component 104. Furthermore, the I/O components 106 are positioned between the core decoupling component 116 and the core component 104.

Figure 3:
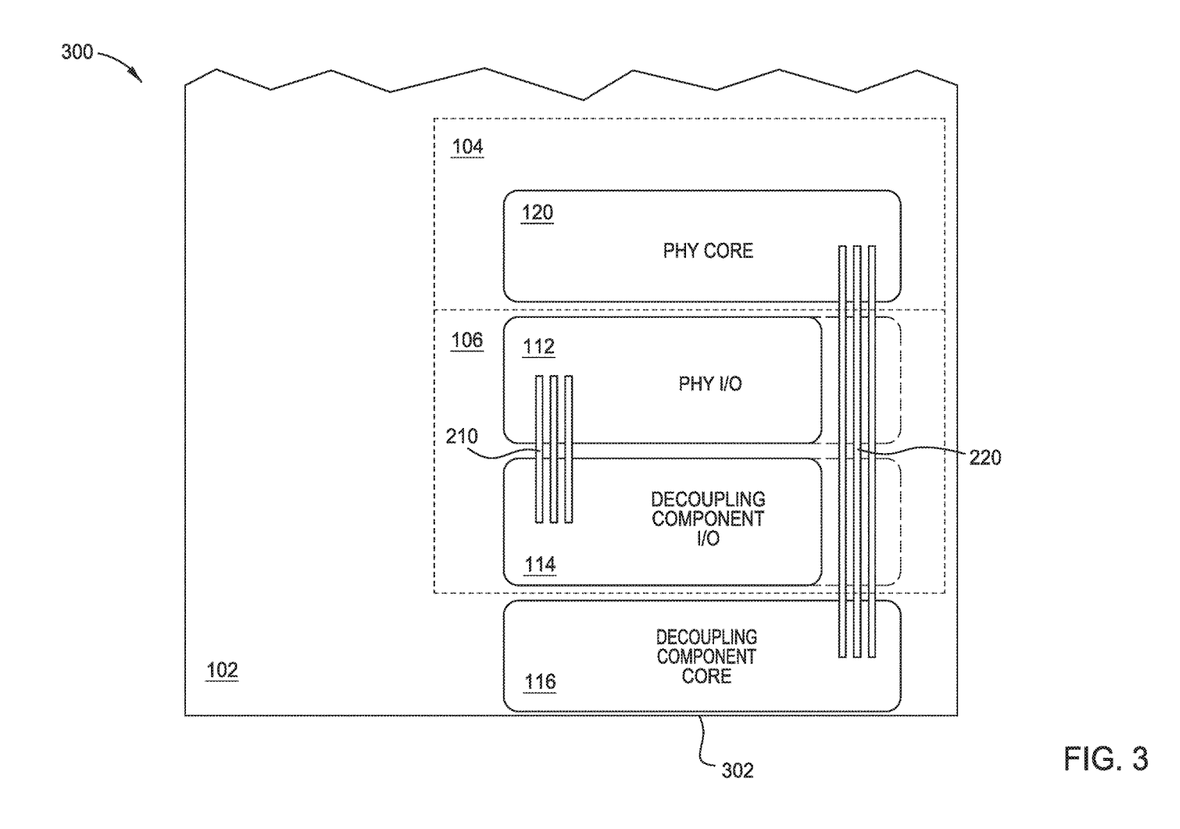
FIG. 3 is a block diagram of a SOC device in which a decoupling capacitance component core is positioned at a bottom side edge of the SOC device according to some embodiments.

FIG. 3 is a block diagram 300 of the SOC device 102 of FIG. 1 in which the core decoupling component 116 is positioned at a bottom side edge 302 of the SOC device 102, according to another embodiment. FIG. 3 is similar to the diagram 200 of FIG. 2, but with the core decoupling component 116 positioned at the bottom side edge 302 of the SOC device 102.

Figure 4:
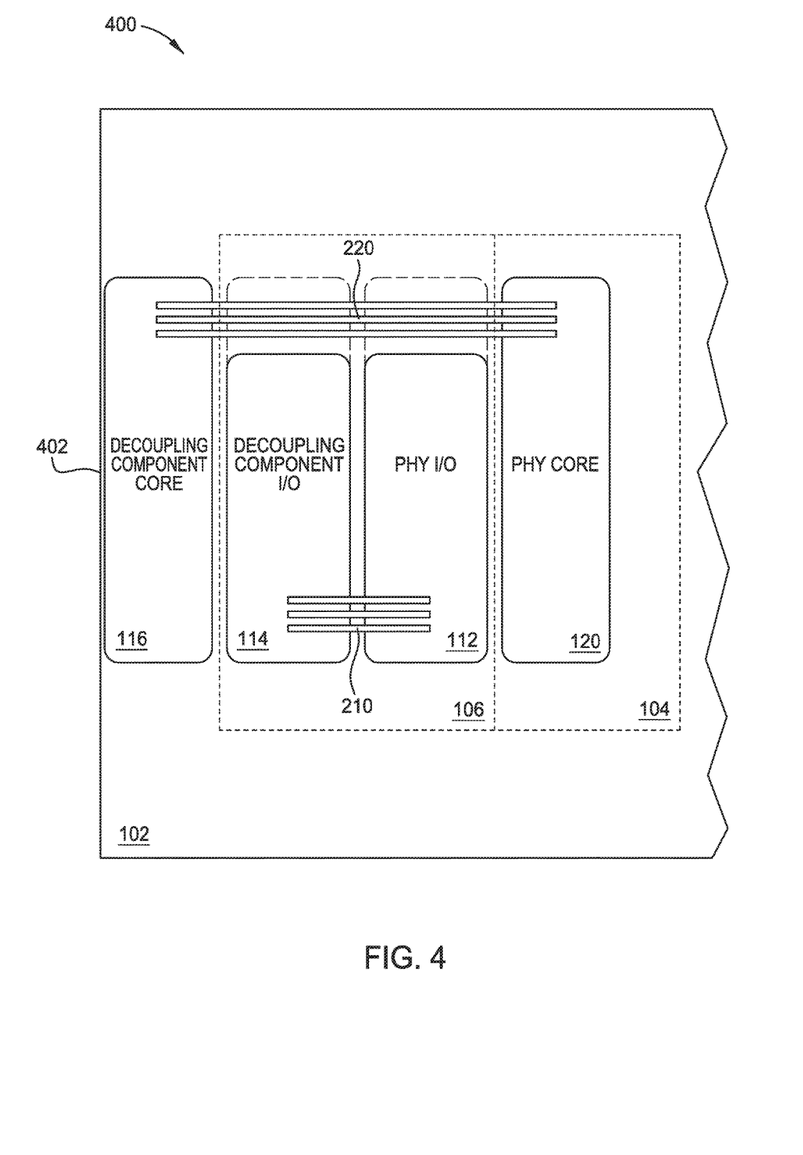
FIG. 4 is a block diagram of a SOC device in which a decoupling capacitance component is positioned at a left side edge of the SOC device, according to some embodiments.

FIG. 4 is a block diagram 400 of the SOC device 102 of FIG. 1 in which the core decoupling component 116 is positioned at a left side edge 402 of the SOC device 102, according to another embodiment. FIG. 4 is similar to the diagram 200 of FIG. 2, but with the core decoupling component 116 positioned at the left side edge 402 of the SOC device 102.

Figure 5:
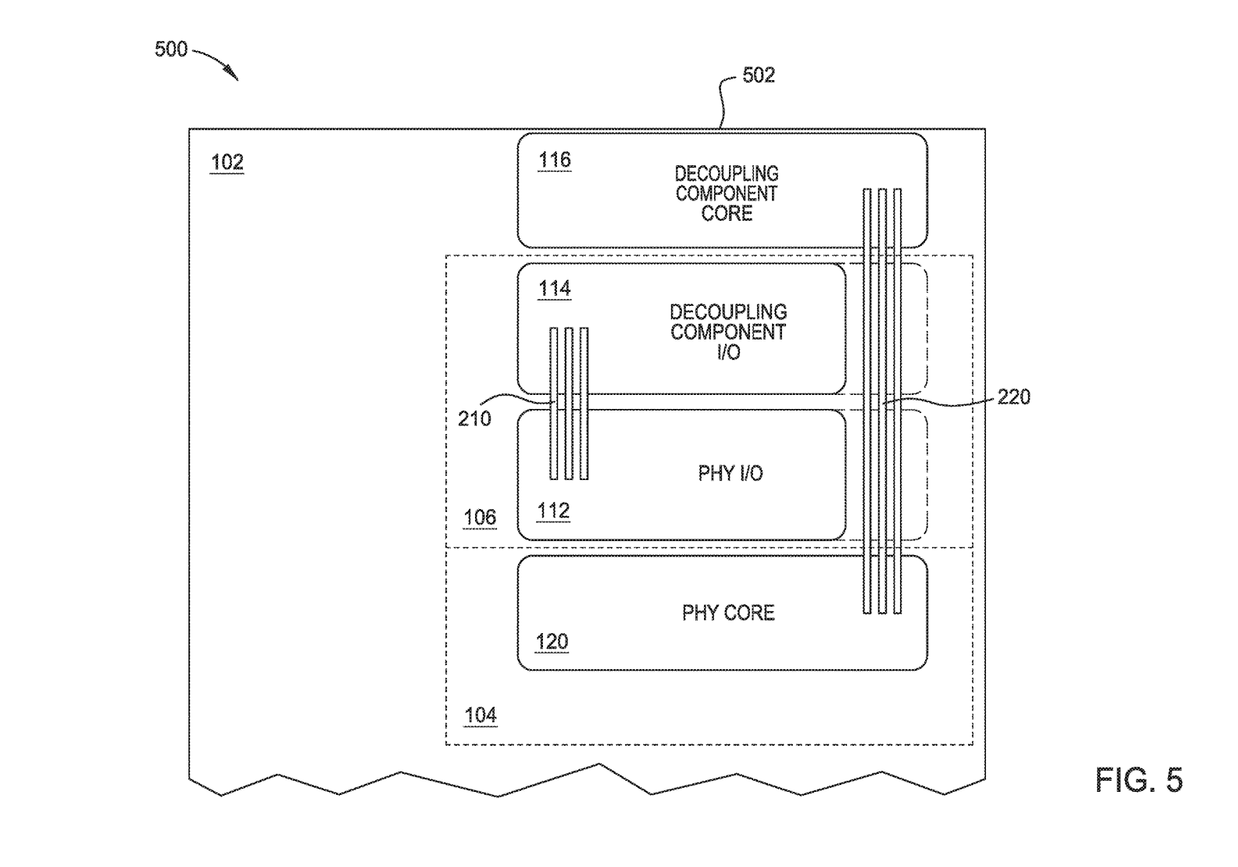
FIG. 5 is a block diagram of a SOC device in which a decoupling capacitance component is positioned at a top side edge of the SOC device, according to some embodiments.

FIG. 5 is a block diagram 500 of the SOC device 102 of FIG. 1 in which the core decoupling component 116 is positioned at a top side edge 502 of the SOC device 102, according to another embodiment. FIG. 5 is similar to the diagram 200 of FIG. 2, but with the core decoupling component 116 positioned at the top side edge 502 of the SOC device 102.

Figure 6:
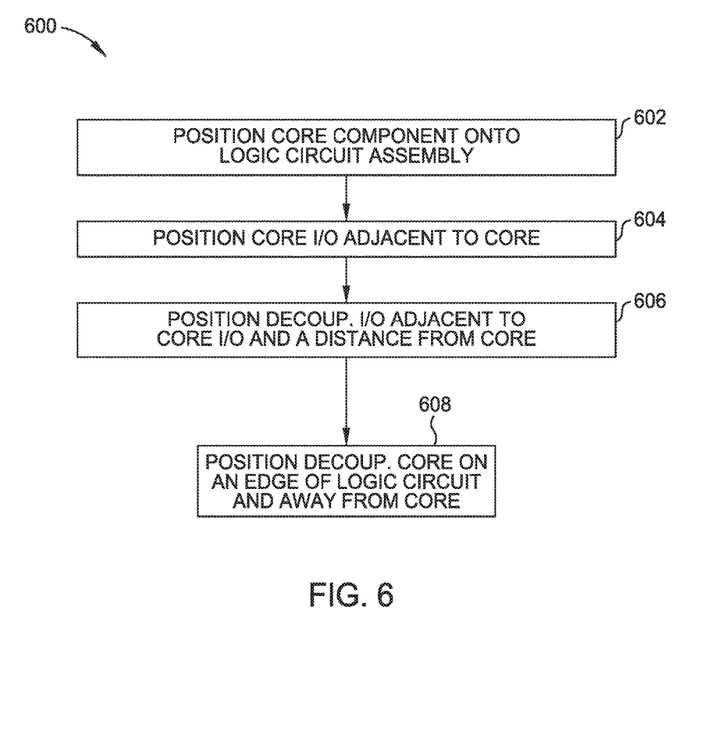
FIG. 6 is a flowchart representing a method for configuring a decoupling capacitance component core into a logic circuit design, according to one embodiment.

FIG. 6 is a flowchart representing a method 600 for configuring a core decoupling component 116 into a logic circuit design, according to one embodiment. The method 600 includes positioning the core component 104 containing the SOC logic 108 and the PHY core 120 onto the logic circuit assembly 100 at block 602. Next, the PHY I/O component 112 is positioned on the logic circuit assembly 100 at block 604. Next, at block 606, the I/O decoupling component 114 is positioned onto the logic circuit assembly 100 adjacent to the PHY I/O component 112 but a non-zero distance away from the core component 104. Next, the core decoupling component 116 is positioned onto the logic circuit assembly 100 and is logically coupled to the core component 104 and physically and electrically isolated from the core component 104. The core decoupling component 116 can be positioned in a number of locations on the logic circuit assembly 100 as described in FIGS. 3-6. At block 608, the core decoupling component 116 is positioned on the edge of the logic circuit assembly 100 and a distance away from the PHY core 120.

As disclosed herein, positioning the core decoupling component 116 at a location a distance away from, yet electrically coupled to, the PHY core 120 in a logic circuit assembly 100, such as a SOC device 102, offers advantages in preserving logic device area, improves operating frequency, timing, and bandwidth of the logic device by allowing for shorter data and signal lines by being able to route lines directly between the SOC logic 108 and the PHY core 120, and reduces ESR.

The present disclosure generally relates to a device with a PHY core component, a PHY I/O component, a decoupling I/O component, and a decoupling core component, where the PHY core component is adjacent to the PHY I/O component, the PHY I/O component is adjacent to the decoupling I/O component, the decoupling I/O component is adjacent to the decoupling core component and is positioned a first distance away from the PHY core component, and the decoupling core component is adjacent to an edge of the device and is positioned a second distance away from the PHY core component.

The device may also include where the device is a System-on-Chip (SOC) logic device. The device may also include where the decoupling core component is positioned on an edge of the device a non-zero distance away from the PHY core component. The device may also include where the decoupling core component is positioned on a same surface of the device and a non-zero distance away from the PHY core component. The device may also include where the decoupling core component is positioned within a component different than the PHY core component. The device may also include where the PHY core component is logically coupled to the PHY I/O component and electrically coupled to the decoupling core component, the PHY core component is electrically isolated from the PHY I/O component, the decoupling I/O component, and the decoupling core component, the PHY I/O component is electrically coupled to the decoupling I/O component, and the decoupling core component is electrically isolated from the PHY I/O component and the decoupling I/O component.

In another embodiment, a device having a physical layer (PHY) core component, a system-on-chip core logic component, an input/output (I/O) component, a decoupling I/O component, a decoupling core component, and means for operating a logic circuit, where the PHY core component is electrically coupled to the system-on-chip core logic component and the decoupling core component, the system-on-chip core logic component is electrically coupled to the I/O component, the PHY core component is electrically isolated from the I/O component, and the decoupling I/O component, and the decoupling core component, the I/O component is electrically coupled to the decoupling I/O component, the PHY core component is electrically coupled to the decoupling core component, and the decoupling core component is electrically isolated from the I/O component and the decoupling I/O component.

The device may also include where the decoupling core component is located on a substrate of the device different than that of the PHY core component. The device may also include where the decoupling core component is made of metal-oxide-metal capacitors. The device may also include where the decoupling core component is positioned on a same surface of the device and a non-zero distance away from the PHY core component. The device may also include where the decoupling core component is positioned within a component different than the PHY core component. The device may also include where the decoupling core component is positioned on an edge of the device a non-zero distance away from the PHY core component.

In another embodiment, a method of configuring a logic circuit, that includes positioning a physical layer (PHY) core component onto the logic circuit, positioning a system-on-chip core logic component onto the logic circuit, positioning a PHY input/output (I/O) component adjacent to the PHY core component, positioning a decoupling I/O component adjacent to the PHY I/O component and a first distance away from the PHY core component, and positioning a decoupling core component adjacent to an edge of the logic circuit and a second distance away from the PHY core component, and where the PHY core component is electrically coupled to the system-on-chip core logic component, the system-on-chip core logic component is logically coupled to the I/O component, the PHY core component is electrically isolated from the I/O component, the decoupling I/O component, and the decoupling core component, the I/O component is electrically coupled to the decoupling I/O component, the PHY core component is logically coupled to the decoupling core component, and the decoupling core component is electrically isolated from the I/O component and the decoupling I/O component.

The method may also include where the decoupling core component is located on a substrate of the logic circuit different than that of the PHY core component. The method may also include where the decoupling core component is made of metal-oxide-metal capacitors. The method may also include where the decoupling core component is located at an edge of the logic circuit a non-zero distance away from the PHY core component.

In another embodiment, a system that includes a PHY core component, a PHY I/O component, a decoupling I/O component, and a decoupling core component, where the decoupling core component is adjacent to an edge of a logic circuit assembly, the decoupling I/O component is adjacent to the decoupling core component, the PHY I/O component is adjacent to the decoupling I/O component and spaced a first distance from the edge of the logic circuit assembly, and the PHY core component is adjacent to the PHY I/O component and spaced a second distance from the edge of the logic circuit assembly.

The system may also include where the PHY core component is logically coupled to the PHY I/O component, the PHY core component is electrically isolated from the PHY I/O component, the decoupling I/O component, and the decoupling core component, the PHY I/O component is electrically coupled to the decoupling I/O component, and the decoupling core component is electrically isolated from the PHY I/O component and the decoupling I/O component.

In another embodiment, a system that includes a host device and a logic circuit coupled to the host device, the logic circuit having a PHY core component, a system-on-chip core logic component, a I/O component, a decoupling I/O component, and a decoupling core component, where the decoupling core component is spaced a first distance from the decoupling I/O component, and the system-on-chip core logic component is spaced a second distance from the decoupling core component.

The system may also include where the decoupling core component is positioned on an edge of the logic circuit a non-zero distance away from the PHY core component. The system may also include where the decoupling core component is positioned on a same surface of the logic circuit and a non-zero distance away from the PHY core component. The system may also include where the PHY core component is electrically coupled to the system-on-chip core logic component, the system-on-chip core logic component is logically coupled to the I/O component, the PHY core component is electrically isolated from the I/O component, the decoupling I/O component, and the decoupling core component, the I/O component is electrically coupled to the decoupling I/O component, the PHY core component is electrically coupled to the decoupling core component, and the decoupling core component is electrically isolated from the I/O component and the decoupling I/O component. The system may also include where the decoupling core component is located on a substrate of the logic circuit different than that of the PHY core component. The system may also include where the decoupling core component is made of metal-oxide-metal capacitors.

While the foregoing is directed to embodiments of the present disclosure, other and further embodiments of the disclosure may be devised without departing from the basic scope thereof, and the scope thereof is determined by the claims that follow.

What is claimed is:
1. A device, comprising:
a physical layer (PHY) core component;
a PHY input/output (I/O) component;
a decoupling I/O component; and
a decoupling core component, wherein:
the PHY core component is adjacent to the PHY I/O component,
the PHY I/O component is adjacent to the decoupling I/O component,
the decoupling I/O component is adjacent to the decoupling core component and is positioned a first distance away from the PHY core component, and
the decoupling core component is adjacent to an edge of the device and is positioned a second distance away from the PHY core component.
2. The device of claim 1, wherein the device comprises a System-on-Chip (SOC) logic device.
3. The device of claim 1, wherein the decoupling core component is positioned on an edge of the device a non-zero distance away from the PHY core component.
4. The device of claim 1, wherein the decoupling core component is positioned on a same surface of the device and a non-zero distance away from the PHY core component.
5. The device of claim 1, wherein the decoupling core component is positioned within a component different than the PHY core component.
6. The device of claim 1, wherein:
the PHY core component is logically coupled to the PHY I/O component and the decoupling core component,
the PHY core component is electrically isolated from the PHY I/O component, the decoupling I/O component, and the decoupling core component, the PHY I/O component is electrically coupled to the decoupling I/O component, and the decoupling core component is electrically isolated from the PHY I/O component and the decoupling I/O component.

7. A device, comprising:
a physical layer (PHY) core component;
a system-on-chip core logic component;
an input/output (I/O) component;
a decoupling I/O component;
a decoupling core component; and
means for operating a logic circuit, wherein:
the PHY core component is electrically coupled to the system-on-chip core logic component,
the system-on-chip core logic component is logically coupled to the I/O component,
the PHY core component is electrically isolated from the I/O component, the decoupling I/O component
the I/O component is electrically coupled to the decoupling I/O component,
the PHY core component is electrically coupled to the decoupling core component, and
the decoupling core component is electrically isolated from the I/O component and the decoupling I/O component.

8. The device of claim 7, wherein the decoupling core component is located on a substrate of the device different than that of the PHY core component.

9. The device of claim 7, wherein the decoupling core component is comprised of metal-oxide-metal capacitors.

10. The device of claim 7, wherein the decoupling core component is positioned on a same surface of the device and a non-zero distance away from the PHY core component.

11. The device of claim 7, wherein the decoupling core component is positioned within a component different than the PHY core component.

12. The device of claim 7, wherein the decoupling core component is positioned on an edge of the device a non-zero distance away from the PHY core component.

13. A method of configuring a logic circuit, comprising:
positioning a physical layer (PHY) core component onto the logic circuit;
positioning a system-on-chip core logic component onto the logic circuit;
positioning a PHY input/output (I/O) component adjacent to the PHY core component;
positioning a decoupling I/O component adjacent to the PHY I/O component and a first distance away from the PHY core component; and
positioning a decoupling core component adjacent to an edge of the logic circuit and a second distance away from the PHY core component, wherein:
the PHY core component is electrically coupled to the system-on-chip core logic component,
the system-on-chip core logic component is logically coupled to the I/O component,
the PHY core component is electrically isolated from the I/O component and the decoupling I/O component
the I/O component is electrically coupled to the decoupling I/O component,
the PHY core component is electrically coupled to the decoupling core component, and
the decoupling core component is electrically isolated from the I/O component and the decoupling I/O component.

14. The method of claim 13, wherein the decoupling core component is located on a substrate of the logic circuit different than that of the PHY core component.

15. The method of claim 13, wherein the decoupling core component is comprised of one or more of metal-oxide-metal capacitors and MOS capacitors.

16. The method of claim 13, wherein the decoupling core component is located at an edge of the logic circuit a non-zero distance away from the PHY core component.

17. A system, comprising:
a physical layer (PHY) core component;
a PHY input/output (I/O) component;
a decoupling I/O component; and
a decoupling core component, wherein:
the decoupling core component is adjacent to an edge of a logic circuit assembly,
the decoupling I/O component is adjacent to the decoupling core component,
the PHY I/O component is adjacent to the decoupling I/O component and spaced a first distance from the edge of the logic circuit assembly, and
the PHY core component is adjacent to the PHY I/O component and spaced a second distance from the edge of the logic circuit assembly.

18. The system of claim 17, wherein the decoupling core component is positioned a non-zero distance away from the PHY core component.

19. The system of claim 17, wherein the decoupling core component is positioned on a same surface of the logic circuit assembly and a non-zero distance away from the PHY core component, and is located on a substrate of the logic circuit assembly different than that of the PHY core component.

20. The system of claim 17, wherein:
the PHY core component is logically coupled to the PHY I/O component and the decoupling core component,
the PHY core component is electrically isolated from the PHY I/O component and the decoupling I/O component,
the PHY I/O component is electrically coupled to the decoupling I/O component, and
the decoupling core component is electrically isolated from the PHY I/O component and the decoupling I/O component.

21. The system of claim 17, wherein the decoupling core component is comprised of metal-oxide-metal capacitors.

22. A system, comprising:
a host device; and
a logic circuit coupled to the host device, the logic circuit comprising:
a physical layer (PHY) core component;
a system-on-chip core logic component;
an input/output (I/O) component;
a decoupling I/O component; and
a decoupling core component, wherein:
the decoupling core component is spaced a first distance from the decoupling I/O component, and
the system-on-chip core logic component is spaced a second distance from the decoupling core component.

23. The system of claim 22, wherein the decoupling core component is positioned on an edge of the logic circuit a non-zero distance away from the PHY core component.

24. The system of claim 22, wherein the decoupling core component is positioned on a same surface of the logic circuit and a non-zero distance away from the PHY core component.

25. The system of claim 22, wherein:
the PHY core component is electrically coupled to the system-on-chip core logic component,
the system-on-chip core logic component is logically coupled to the I/O component,
the PHY core component is electrically isolated from the I/O component and the decoupling I/O component,
the I/O component is electrically coupled to the decoupling I/O component,
the PHY core component is electrically coupled to the decoupling core component, and
the decoupling core component is electrically isolated from the I/O component and the decoupling I/O component.

26. The system of claim 22, wherein the decoupling core component is located on a substrate of the logic circuit different than that of the PHY core component.

27. The system of claim 22, wherein the decoupling core component is comprised of metal-oxide-metal capacitors.

\* \* \* \* \*